INVENTORS
RICHARD E. BONIN
JOHN R. TUCKER, JR.
BY
John B. Sponsler

Aug. 8, 1967  R. E. BONIN ETAL  3,335,326
ELECTRICAL CABLE SUPPORT
Filed May 17, 1965
2 Sheets-Sheet 2
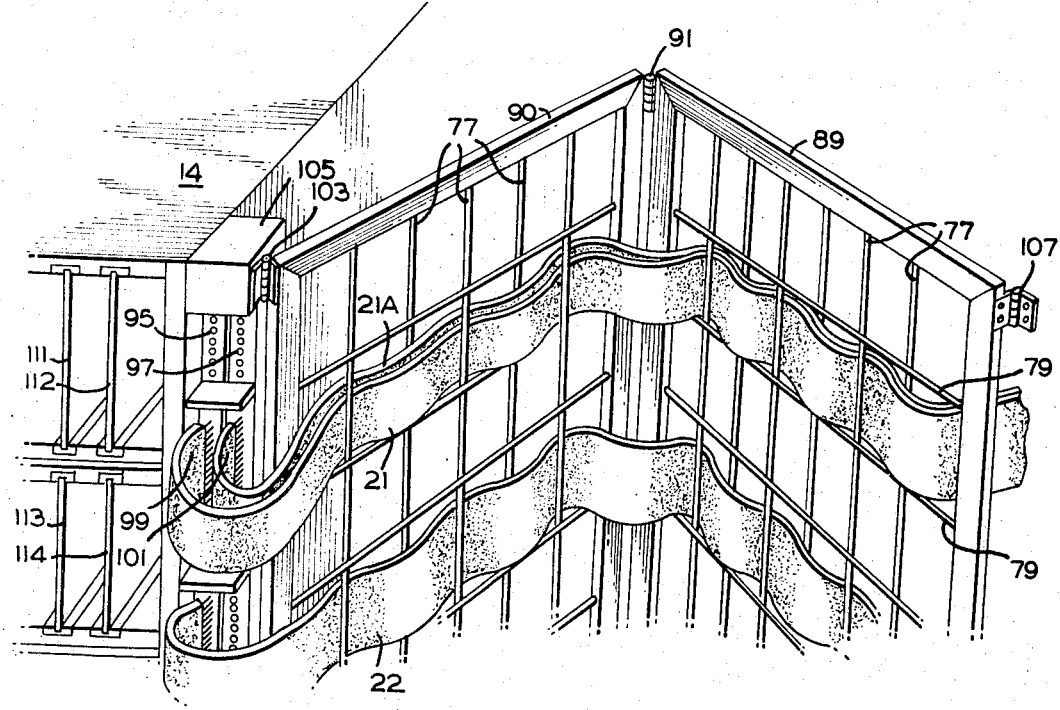
INVENTORS
RICHARD E. BONIN
JOHN R. TUCKER, JR.

United States Patent Office 3,335,326
Patented Aug. 8, 1967

3,335,326
ELECTRICAL CABLE SUPPORT
Richard E. Bonin and John R. Tucker, Jr., Roanoke, Va., assignors to General Electric Company, a corporation of New York
Filed May 17, 1965, Ser. No. 456,257
3 Claims. (Cl. 317—99)

ABSTRACT OF THE DISCLOSURE

A series of hinged-together frames for supporting electrical, multi-conductor cables connecting groups of electrical components, one group being fixed and another group being movable, the free ends of the series of frames being hinged to these groups respectively. Each of the frames comprises a meshlike structure of spaced vertical and horizontal supporting members, the ends of these members being fixed in the sides of the frames. The arrangement provides that the physical positions of the cables remain relatively unchanged when the movable group is positioned away from the fixed group so that the electrical relationships of the individual conductors of the cables are maintained substantially constant for all positions of the movable group as in packaged electrical apparatus such as the cabinet of an electronic computer.

---

Figure 1:
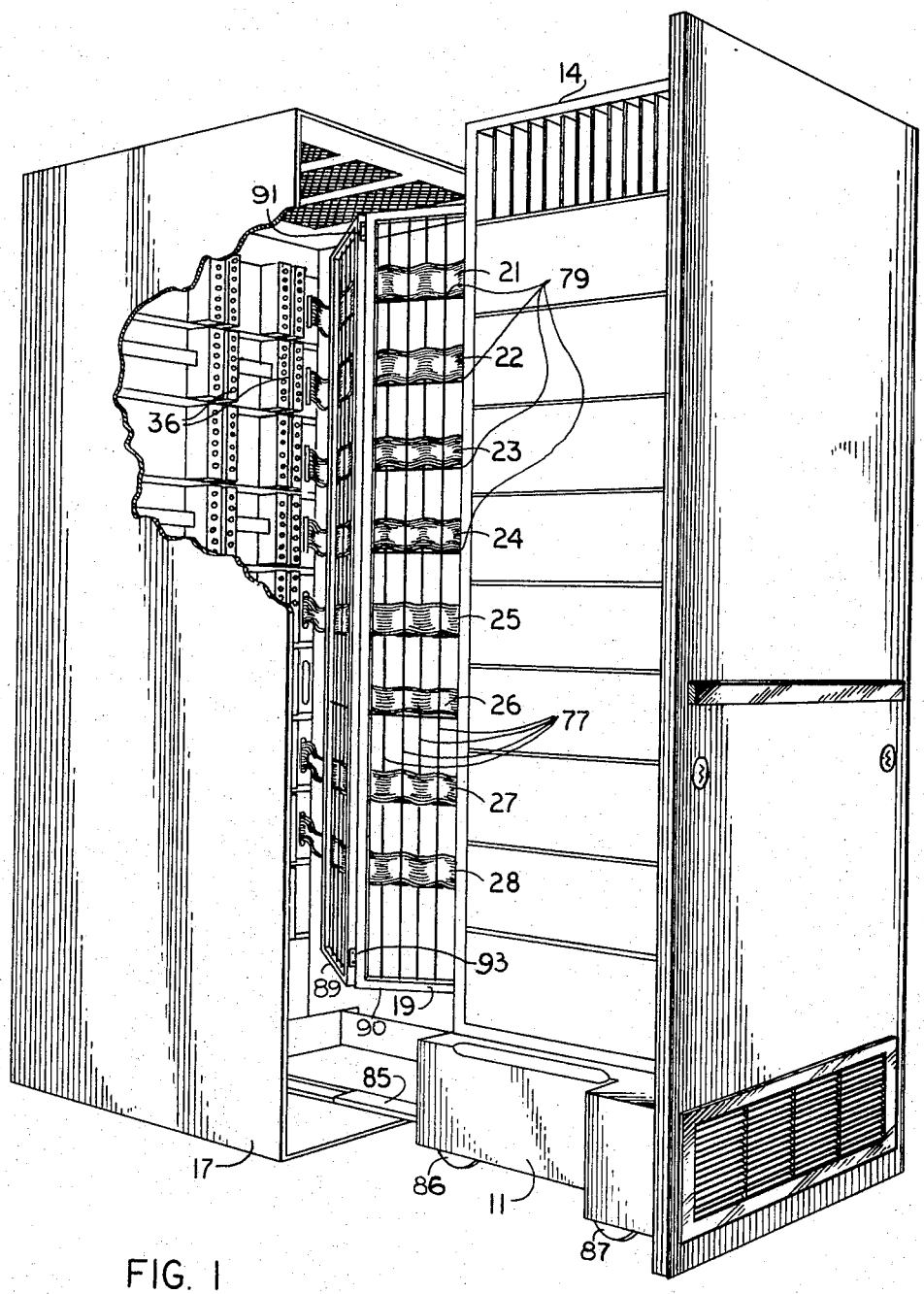

This invention relates to electrical apparatus having multiple cabled connections between different groups of such apparatus enabling the groups to be separated physically an appreciable distance without the necessity of disrupting such connections. More particularly, the invention is concerned with a means of cable support wherein the interconnecting cabled connections are retained in predetermined positions with respect to one another in such apparatus before and after the groups have been separated and returned to their original positions.

In packaged electrical control apparatus frequently advantage is taken in having various components mounted in depth within a cabinet or similar structure with various other components or instruments mounted upon a panel or door upon the front of the cabinet structure. In some instances the front panel or door is arranged so that it may be pulled or withdrawn from the cabinet structure for ready access to the interior and without disassembly of the apparatus for purposes of maintenance, inspection and the like. Normally complex electronic control apparatus is arranged somewhat along these lines since the operating potentials are of a low order of magnitude, and compactness is required in order to provide the maximum of equipment within a minimum of space.

One of the problems in packaged apparatus of this nature is the matter of interconnections, particularly between the front panel and the various layers of internal apparatus. Since the number of wired connections frequently requires hundreds of interconnecting conductors of necessity, some form of cable structure is required in order to avoid jamming or breaking the connections between layers of extendable apparatus and the stationary cabinet structure. The interactions of conductors bunched in cables connecting electronic apparatus normally require careful and accurate positioning so that their physical positions with respect to each other, once properly spaced, do not vary. Ribbon-type cables very often are resorted to in this respect since their construction affords accurate alignment of the conductors inherently, and they can be arranged symmetrically within some pattern physically to reduce electrical interaction to a minimum.

A problem with both ribbon cables and concentric cables, however, is the physical containment of these implements within predetermined limits of the structure in predetermined positions to avoid changing the electrical interactions between conductors and to avoid physical damage to the cables per se from entangling, deforming, or placing excessive strains upon the individual conductors which might tend to break electrical connections thereof.

The present invention, therefore, provides a means in the form of hinged, supporting gates or panels through which the cables are threaded whereby upon withdrawal of the front panel a predetermined path of flexure and recovery of the cables may be obtained, thereby avoiding physical damage or distortion and leaving the relative positions of conductors within the cables unchanged in respect to nearby parallel cables.

This invention is directed toward a wire and cable support, and more particularly toward a folding support which retentively maintains individual conductors of electrical cables for all positions of the support.

It is therefore the object of this invention to provide a new and improved cabling support which will retain individual conductors of an electrical cable in a fixed relationship to each other to avoid change in electrical interaction.

A further object of this invention is to provide a new and improved cabling support which will physically protect electrical conductors from damage and entanglement.

The invention is set forth with particularity in the appended claims. The principles and characteristics of the invention, as well as other objects and advantages are revealed and discussed through the medium of the illustrative embodiments appearing in the specification and drawings which follow.

In the drawings:
FIGURE 1 shows a general view of the electronic control packaging technique.
FIGURE 2 shows a view of the wiring gate containing cables.

In FIGURE 1, a truck 11, containing ventilating fan and air filters (not shown), supports an electronic unit 14. The truck 11 is movable on four wheels of which 86 and 87 are shown. Roller guide 85 guides and limits the removal of the electronic unit from its cabinet 17.

User's terminating points 36, located in the rear wall of stationary cabinet 17, provide convenient electrical connections to the electronic equipment, and conductor cables 21–28 provide electrical connections between stationary points 36 and electronic unit 14.

Wiring gate 19, which consists of two flexibly connected frames 89 and 90, supports the conductor cables 21–28 on horizontal rods 79. Vertical rods 77 within frames 89 and 90 retain the cables 21–28 in a vertical fixed position once the cables have been threaded through the coarse mesh, formed by the horizontal and vertical rods 79 and 77 respectively.

Hinges 91 and 93 provide a flexible joint between the frames 89 and 90 while other hinges along the vertical outside edges of the frames provide support at the stationary cabinet end and the movable electronic end of the wiring gate 19.

FIGURE 2 shows cables 21, 21A and 22 threaded through vertical rods 77 and supported by horizontal rods 79. The cables terminate at the electronic unit end in plugs 99 and 101, which are plugged into receptacles which cannot be seen, but which are identical to those indicated by numerals 95 and 97. Receptacles 95 and 97 are representative of all the receptacles which are mounted in receptacle support 105 along the full height of the electronic unit. The receptacle support 105 provides mounting space for wiring gate support hinge 103 at the top end and another hinge (not shown) at the bottom end.

Wiring gate support at the stationary cabinet side of the wiring gate is provided by hinges 107.

Signals to and from representative circuit boards 111–114 are conducted by individual wires to the terminating points of the receptacles 95 and 97 from where the plugs 99 and 101 and the cables 21, 21A and 22 carry the current to and from the stationary terminating points 36 in the cabinet 17.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. An apparatus comprising a plurality of frames hinged together, a plurality of support members interwoven within said frames, a flexible multiconductor cable threaded through said support members, a group of stationary electrical components, a group of movable electrical components, one of said frames being hinged to said group of stationary components and another of said frames being hinged to said group of movable components, said stationary and movable groups being electrically interconnected by said multiconductor cable retained in predetermined position by said support members for positions of said hinged members while said movable group is displaced from said stationary group.

2. An apparatus comprising two rigid frames hinged together, a stationary group of electrical components hinged to a first said frame, a movable group of electrical components hinged to a second said frame, means of displacing said movable group of electrical components with respect to said stationary group of electrical components, a plurality of support members interwoven to form a coarse mesh within said frames, a flexible multiconductor cable threaded through said support members, said cable electrically interconnecting said groups of stationary and movable electrical components, said cable being retained in predetermined fixed position by said support members for all positions of said frames whereby the relative positions of the individual conductors of said cable are maintained unchanged while said movable group is displaced from said stationary groups.

3. An apparatus comprising two rigid frames hinged together, a stationary group of electrical components hinged to a first said frame, a movable group of electrical components hinged to a second said frame, means of displacing said movable group of components from said stationary components, a plurality of vertical rods rigidly mounted within said frames, a plurality of horizontal rods rigidly mounted within said frames, said horizontal and vertical rods forming a coarse mesh, a flexible multiconductor cable threaded through said vertical rods resting upon horizontal rods electrically connecting components of said stationary group to components of said movable group, said cable being retained in predetermined position by said vertical and horizontal rods for all positions of said frames while said movable components are displaced from said stationary components.

References Cited

UNITED STATES PATENTS 3,219,750  11/1965  Davies _____ 174—69
3,257,156  6/1966  Sisk et al. _____ 174—69 X DARRELL L. CLAY, *Primary Examiner.*